(12) United States Patent
Miyamoto et al.

(10) Patent No.: US 7,933,184 B2
(45) Date of Patent: Apr. 26, 2011

(54) MULTILAYERED OPTICAL DISC AND ITS RECORDING METHOD

(75) Inventors: Harukazu Miyamoto, Higashimurayama (JP); Takahiro Kurokawa, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 56 days.

(21) Appl. No.: 12/569,088

(22) Filed: Sep. 29, 2009

(65) Prior Publication Data
US 2010/0214896 A1 Aug. 26, 2010

(30) Foreign Application Priority Data

Feb. 24, 2009 (JP) ................. 2009-040136

(51) Int. Cl.
*G11B 7/20* (2006.01)
*G11B 17/00* (2006.01)
*G11B 5/58* (2006.01)
*B32B 3/02* (2006.01)

(52) U.S. Cl. ...... 369/94; 369/47.5; 369/53.41; 428/64.4

(58) Field of Classification Search .............. 369/47.5, 369/53.41, 53.61, 94, 283; 428/64.4
See application file for complete search history.

(56) References Cited

U.S. PATENT DOCUMENTS

| 5,414,451 | A | 5/1995 | Sugiyama et al. | |
|---|---|---|---|---|
| 6,370,093 | B1 * | 4/2002 | Tada et al. ................ | 369/44.25 |
| 6,538,978 | B1 * | 3/2003 | Holtslag et al. ............ | 369/275.1 |
| 6,904,011 | B2 * | 6/2005 | Van Woudenberg et al. ................ | 369/59.25 |
| 2003/0185121 | A1 | 10/2003 | Narumi et al. | |
| 2004/0085874 | A1 | 5/2004 | Akiyama et al. | |
| 2004/0264339 | A1 | 12/2004 | Miyagawa et al. | |
| 2007/0002483 | A1 | 1/2007 | Suh | |
| 2007/0097808 | A1 * | 5/2007 | Maruyama et al. ........ | 369/30.37 |
| 2007/0261068 | A1 | 11/2007 | Yoshihiro et al. | |
| 2008/0101209 | A1 | 5/2008 | Nagai et al. | |

FOREIGN PATENT DOCUMENTS

| JP | 05-101398 | 4/1993 |
|---|---|---|
| JP | 2003-030842 | 1/2003 |
| JP | 2003-109217 | 4/2003 |
| JP | 2004-171740 | 6/2004 |
| JP | 2004-327038 | 11/2004 |
| JP | 2005-038584 | 2/2005 |
| JP | 2007-287320 | 11/2007 |
| JP | 2008-108388 | 5/2008 |
| JP | 2008-192258 | 8/2008 |
| WO | WO 02/23542 | 3/2002 |
| WO | WO 2007/004821 | 1/2007 |

* cited by examiner

*Primary Examiner* — Craig A. Renner
*Assistant Examiner* — Aneeta Yodichkas
(74) *Attorney, Agent, or Firm* — Antonelli, Terry, Stout & Kraus, LLP.

(57) ABSTRACT

In an optical disc having N (N is an integer larger than or equal to 3) information recording layers of rewritable or recordable type, each of the information recording layers includes an test area to adjust conditions for recording and reproduction and the test areas are arranged so that the radial positions thereof overlap those of other layers. Recording test is performed only to an area smaller than or equal to 1/N of the test area of each layer and any other area is always unrecorded (write inhibited).

8 Claims, 9 Drawing Sheets

321

432  431  432

← ABOUT 100 TRACKS →

$$\frac{A-B}{A+B}<0$$

$$\frac{A-B}{A+B}=0$$

$$\frac{A-B}{A+B}>0$$

$$\beta=\frac{A1-A2}{A1+A2}<0$$

$$\beta=\frac{A1-A2}{A1+A2}=0$$

$$\beta=\frac{A1-A2}{A1+A2}>0$$

MULTILAYERED OPTICAL DISC AND ITS RECORDING METHOD

INCORPORATION BY REFERENCE

The present application claims priority from Japanese application JP2009-040136 filed on Feb. 24, 2009, the content of which is hereby incorporated by reference into this application.

BACKGROUND OF THE INVENTION

The present invention relates to an optical disc having a plurality of recording layers and a recording method of the optical disc.

FIG. 2 schematically illustrates the sectional structure of a prior-art multilayered optical disc and the principle of reading and writing information in each recording layer selectively. In this prior-art example, the recording medium has 5 recording layers in total (first recording layer 411, second recording layer 412, third recording layer 413, fourth recording layer 414 and fifth recording layer 415). In this 5-layered recording medium, for example, in order to access information recorded in the second recording layer 412, the position of an objective lens 30 is controlled to position an optical spot 32 on the second recording layer 412. At this time, convergent light 31 focused by the objective lens passes through the first semitransparent recording layer 411 on the way thereof but the beam diameter of the convergent light 31 on the first recording layer is sufficiently larger than that of the optical spot 32 on the second recording layer 412. Accordingly, recorded information in the first semitransparent recording layer 411 cannot be analyzed or resolved to be reproduced. Since the beam diameter of the convergent light on the first semitransparent recording layer 411 is larger, the light intensity thereof per unit area is relatively small and it is not apprehended that information recorded in the first recording layer 411 is destroyed upon recording. In this manner, it can be realized that information can be recorded in or reproduced from the second recording layer farther than the first recording layer without influence of the first recording layer.

Similarly, when information is recorded in or reproduced from the fifth recording layer 415, the position of the objective lens 30 is controlled to position the optical spot 32 on the fifth recording layer 415. The beam diameter on the layer adjacent to the target layer for recording/reproduction is given by the following expression (1):

$$2 \times d \times (NA/n)/(1-NA/n)^2)^{(1/2)} \quad (1)$$

where d is interlayer spacing between layers, NA a numerical aperture of the objective lens, λ a wavelength of light and n a refractive index of a transparent interlayer. For example, when d is 8 μm and NA is 0.85, the beam diameter is about 10 μm and is 20 or more times larger in diameter and 400 or more times larger in area as compared with the diameter λ/NA=470 nm of the optical spot 32 on the target layer at the time that wavelength is 400 nm. In this manner, the conditions for performing recording/reproduction to the optical recording medium having a plurality of recording layers without influence of other layers are described in JP-A-5-101398 in detail.

In such an optical disc having a plurality of layers, there arises a problem that when information is recorded in a farther layer as viewed from the light incident side, the laser power reaching the farther layer is different due to difference of the effective transmittance of the nearer layer between the case where information is recorded in the farther layer through unrecorded area in the nearer layer and the case where information is recorded in the farther layer through recorded area in the nearer layer. This problem is schematically illustrated referring to FIGS. 5A and 5B. FIG. 5A shows an optical spot focused on an n-th recording layer (n-th layer) and FIG. 5B shows an optical beam passing through the recording layer (m-th layer) nearer than the n-th layer when the optical spot is focused on the n-th layer. Vertical lines in FIGS. 5A and 5B show recording tracks formed in the n- and m-th layers. Area 431 is an area where any information is not recorded (unrecorded area) and area 432 is an area where any information is recorded (recorded area). In case of Blu-ray disc, the track pitch is 0.32 μm and the optical beam incident on the m-th layer spreads over the range containing about 100 tracks though it depends on the distance from the n-th layer to the m-th layer and the spread optical beam passes through the m-th layer. The transmittances of the recorded area and the unrecorded area are different and accordingly even when the same optical beam passes through the areas, the amounts of optical beams passing through the recorded and unrecorded areas are different. That is, the effective transmittance of the m-th layer is changed depending on a ratio of the recorded area and the unrecorded area in the m-th layer.

In order to cope with this problem, JP-A-2003-109217 discloses that a recording medium is structured so that difference between the transmittances of unrecorded part and recorded part in the nearer layer is smaller than or equal to a predetermined value, so that information can be recorded in the farther layer with fixed recording power irrespective of the recording state in the nearer layer.

As described in JP-A-2003-109217, when optical design of the nearer layer (m-th layer) is performed, it is desirable that the transmittance is not changed in the unrecorded and recorded areas. However, usually, the transmittance error of about several to ten % occurs between the unrecorded area 431 and the recorded area 432 due to various factors containing scattering in manufacture of medium and error in design. Moreover, even if the transmittance of the nearer layer can be made equal, the reflection factor is different and accordingly the quality of the reproduced signal from the farther layer is sometimes changed due to influence of the reflected light from the nearer layer.

Accordingly, in an actual medium, there is some transmittance difference between the unrecorded area 431 and the recorded area 432 and the laser power reaching the n-th layer in the case where information is recorded in the n-th layer on the farther side through the unrecorded area 431 of the m-th layer on the nearer side is different from that in the case where information is recorded in the n-th layer on the farther side through the recorded area 432 of the m-th layer on the nearer side due to difference of the effective transmittance of the m-th layer as shown in FIGS. 5A and 5B. More exactly, the effective transmittance of the m-th layer on the nearer side at the time that the optical spot 321 is focused on the n-th layer on the farther side is not changed in a binary manner or digitally but is changed continuously in accordance with the ratio of the unrecorded area and the recorded area occupied by the optical beam 322 on the m-th layer on the nearer side.

An example of influence that this phenomenon affects the recording condition learning is now described. FIG. 3 is a graph showing the relation between recording power and jitter at the time that recording/reproduction is performed to L0 layer on the farther side in 2-layer recordable type optical disc in case where L1 layer on the nearer side is not recorded and in case where L1 layer is recorded. The limit equalizer used normally in the Bru-ray disc is applied as the signal processing method for evaluation of reproduced signal and signal is expressed as the magnitude of signal jitter value. In this measurement, when all area of L1 layer on the nearer side is not recorded, the optimum recording power, that is, the recording power having the minimum jitter is 7.2 mW and the jitter at this time is 6.7%. On the other hand, when all area of L1 layer on the nearer layer is recorded, the optimum recording power is 7.5 mW. In other words, the optimum recording power in case where L1 layer is recorded is shifted by about 7% to the higher power side as compared with the case where L1 layer is not recorded. If the optimum recording power 7.1 mW in case where the L1 layer is not recorded is used to make recording when L1 layer is recorded, jitter is 7.0% and is increased by 0.3% as compared with the optimum recording power is used.

This result means the following, for example. When the recording condition learning for L0 layer is performed, it is supposed that part which the laser beam on L1 layer passes through is unrecorded and the optimum recording power decided in this state is used to make recording to the whole L0 layer. By doing so, when the part which the laser beam on L1 layer passes through is unrecorded, the recording can be made unproblematically, although when the part is recorded, jitter of reproduced signal of data recorded in L0 layer is increased. That is, the effective recording power margin is reduced. Accordingly, in the method described in JP-A-203-109217, the recording power margin is small and therefore it is difficult to make recording over the whole farther layer with high reliability using predetermined recording power.

In order to avoid such a problem, in the prior arts including JP-A-2005-038584 and JPA-2004-327038, areas for optimum power control of plural layers are adapted not to overlap one another, so that learning is always made in the state that the nearer layer is always unrecorded. Moreover, JP-A-2008-192258 discloses that the recording power is learned in both of the case where other layers are recorded and the case where other layers are unrecorded to calculate an average therebetween, so that a problem of error in the recording power learning is avoided.

SUMMARY OF THE INVENTION

However, when the method described in JP-A-2005-038584 and JP-A-2004-327038 in which radial positions of test areas for the optimum power control for the plurality of recording layers are set to be different from one another is applied to the multilayered optical disc having a plurality of recording layers larger than or equal to 3 layers, the following problem arises. In the multilayered recording disc, tracks in different layers are eccentric from one another due to error in superposition upon manufacture. The radius itself of the tracks has some error due to thermal contraction and expansion of substrate and stamper upon manufacture. When test areas are arranged in N different radial positions in an N-layered medium, an area of $(2D+2\Delta+A)\times(N-1)$ must be ensured as a margin in consideration of eccentric component D, radial error $\Delta$ due to thermal deformation and expansion A of spot size in other layer. Typical values of D, $\Delta$ and A in the Bru-ray disc, for example, are about 50, 50 and 25 μm, respectively, and accordingly a 4-layered optical disc is required to ensure a radial area of $(2\times50+2\times50+25)\times(4-1)=675$ μm. Moreover, when the test area is ensured in each layer by 200 μm, it is necessary to ensure a radial area of 675 μm+4×200 μm=1.475 mm for OPC, so that there is a problem that user data area is reduced correspondingly.

When the method of JP-A-2008-192258 in which both of the case where the nearer layer is recorded and the case where it is unrecorded are learned is applied to the optical disc having a plurality of recording layers larger than or equal to 3 layers, there is a problem that the combination of recorded and unrecorded is increased exponentially in accordance with the number of layers, so that it takes time to make learning and substantial user data capacity is reduced in order to ensure both of recorded and unrecorded areas.

It is a first object of the present invention to ensure sufficient test area without reduction of user data area in a multilayered optical disc having 3 or more recording layers.

It is a second object of the present invention to provide a recording method of controlling laser irradiation power to each layer properly to make recording in a multilayered optical disc having 3 or more recording layers.

In order to achieve the first object, the following measures are used.

(1) In an optical disc having N (N is an integer larger than or equal to 3) information recording layers of rewritable or recordable type, each of the information recording layers includes a test area to adjust conditions for recording and reproduction and at least parts of radial positions of the test areas overlap one another between different layers. The test area in each layer includes a plurality of small segments and a small area smaller in number than or equal to 1/N of the small segments in each layer is set to a small area for recording test and a remaining small area is set to a small unrecorded area where information is not recorded.

Consequently, the radial positions of the test areas in the optical disc overlap one another between different layers, so that even if the number of layers is increased, sufficient test areas can be ensured without narrowing the user area. In recording, influence due to the fact that other layers (N-1 layers) except the target layer for recording have been recorded or reproduced can be made smaller than or equal to 1/N at most per layer. That is, even if influence by all other layers is added, the sum total of influence can be suppressed to (N-1)/N or to be smaller than 1. This means that influence of other layers can be suppressed to be smaller than that of 2-layered optical disc even in the optical disc having 3 or more layers. In this connection, when transmitted light is considered, the sum total of influence ought to be expressed by multiplication originally, although the reason that addition is used simply is that since difference of variation in transmittance between recording and unrecorded is generally as small as 10% or less and, in the case of the method of the present invention, is further suppressed to 1/N, approximation using the addition is valid sufficiently.

(2) Each of the small segments includes k recording unit blocks (K is an integer larger than or equal to 1).

Consequently, even if recording is performed only to part of the test area, conditions for recording and reproduction as ordinary recording blocks can be evaluated and accordingly the reliability and the accuracy of test (learning) can be ensured.

(3) When a minimum value of interlayer distance of recording layers is d, the refractive index of a space layer between the recording layers n, an opening ratio of an objective lens of an optical pickup used in recording/reproduction NA, a track pitch Tp and a radius in which the small segments are positioned r, the length of each small segment in the circumferential direction does not exceed the length defined by the following expression (2):

$$[d\times(NA/n)/\{1-(NA/n)^2\}^{(1/2)}]/Tp\times(2\pi r) \qquad (2)$$

The meaning of the above expression is described. $[d\times(NA/n)/\{1-(NA/n)^2\}^{(1/2)}]$ shows, when an optical beam is focused a certain recording layer, a radius of the optical beam on another recording layer separated by the interlayer spacing d and a divided value thereof by the track pitch Tp represents the number of tracks coming into the optical beam on the other recording layer. Accordingly, when the length of the small segment for recording in the circumferential direction is smaller than or equal to $[d\times(NA/n)/\{1-(NA/n)^2\}^{(1/2)}]/Tp\times(2\pi r)$, the small segment is smaller than or equal to a half of the diameter of the optical beam and 2 or more small segments are necessarily contained in the optical spot.

Accordingly, difference between the recording and unrecording is not analyzed or resolved and only an area ratio between the recorded area and the unrecorded area has an influence. Since the ratio of the recording area can be suppressed to be smaller than or equal to 1/N by the configuration described in the above (1), influence due to the fact that other layers (N−1 layers) except the target layer for recording have been recorded or reproduced can be made smaller than or equal to 1/N at most per layer. That is, even if influence by all other layers is added, the sum total of influence can be suppressed to (N−1)/N or to be smaller than 1. This means that influence of other layers can be suppressed to be smaller than that of 2-layered optical disc even in the optical disc having 3 or more layers.

(4) In an optical disc having N (N is an integer larger than or equal to 3) information recording layers of rewritable or recordable type, each of the information recording layers includes a test area to adjust conditions for recording and reproduction and at least parts of radial positions of the test areas overlap one another between different layers. When an address of a recording block in the test area in each layer is L and an integer larger M than N, a natural number b satisfying b≦M/N, an integer a satisfying a+b<M are previously defined, the test recording is performed only to blocks satisfying (L+a)mod M<b and other recording blocks are set to be unrecorded blocks.

Even in this case, similarly to the above (1), since the radial positions of the test areas in different recording layers overlap one another, the sufficient test area can be ensured without narrowing the user area even if the number of layers is increased and influence due to the fact that other layers (N−1 layers) except the target layer for recording have been recorded or reproduced can be made smaller than or equal to 1/N at most per layer. That is, even if influence by all other layers is added, the sum total of influence can be suppressed to (N−1)/N or to be smaller than 1. Furthermore, similarly to the above (2), since the recorded/unrecorded areas are divided in block unit, the conditions for recording and reproduction as the general recording blocks can be evaluated and accordingly the reliability and the accuracy of test (learning) can be ensured. Moreover, since the recordable blocks for test and the unrecorded blocks of the test areas can be previously defined by addresses, how to use the test area can be made identical even when recording/reproduction is performed by a plurality of drives and accordingly the drive interchangeability can be improved.

(5) In the optical disc having N (N is an integer larger than or equal to 3) information recording layers of rewritable or recordable type, each of the information recording layers includes a test area to adjust conditions for recording and reproduction and at least parts of the radial positions of the test areas overlap one another between different layers. When an integer M larger than N and a natural number b satisfying b≦M/N are previously defined, segments each having the length of M blocks including a test area of b blocks and an unrecorded area of M−b blocks are repeatedly arranged in the test area of each layer.

The effects attained by the above are basically the same as those of the above (4), although the above can be applied to the case where continuous addresses are not assigned to continuous blocks in the test area and the case where correspondence of addresses and recording blocks is 1:1 and the versatility is improved.

(6) In an optical disc having N (N is an integer larger than or equal to 3) information recording layers of rewritable or recordable type, each of the information recording layers includes a test area to adjust conditions for recording and reproduction and the range of the radial positions of the test areas is substantially the same between different layers. The test area in each layer includes a plurality of small segments. A small area smaller in number than or equal to 1/N of the small segments in each layer is set to a small area for recording test and a remaining small area is set to a small unrecorded area where information is not recorded.

Consequently, since the radial positions of the test areas of the different layers are substantially the same, the sufficient test areas can be ensured without narrowing the user area even if the number of layers is increased. In recording, influence due to the fact that other layers (N−1 layers) except the target layer for recording have been recorded or reproduced can be made smaller than or equal to 1/N at most per layer. That is, even if influence by all other layers is added, the sum total of influence can be suppressed to (N−1)/N or to be smaller than 1. This means that influence of other layers can be suppressed to be smaller than that of 2-layered optical disc even in the optical disc having 3 or more layers.

In order to achieve the above second object of the present invention, the following measures are used.

(7) In an optical disc having N (N is an integer larger than or equal to 3) information recording layers of rewritable or recordable type, each of the information recording layers includes a test area having a plurality of recording blocks to adjust conditions for recording and reproduction and when test recording is performed to the test area of each layer, the test recording is performed only to the recording blocks smaller in number than or equal to 1/N of the whole blocks in the test area and information is not recorded in remaining blocks.

Consequently, in recording, influence due to the fact that other layers (N−1 layers) except the target layer for recording have been recorded or reproduced can be made smaller than or equal to 1/N at most per layer. That is, even if influence by all other layers is added, the sum total of influence can be suppressed to (N−1)/N or to be smaller than 1. This means that influence of other layers can be suppressed to be smaller than that of 2-layered optical disc even in the optical disc having 3 or more layers.

(8) In an optical disc having N (N is an integer larger than or equal to 3) information recording layers of rewritable or recordable type, each of the information recording layers includes a test area to adjust conditions for recording and reproduction and at least parts of the radial positions of the test areas overlap one another between different layers. When an address of a recording block in the test area is set to L and an integer M larger than N, a natural number b satisfying b≦M/N and an integer a satisfying a+b<M are previously defined, test recording is performed only to blocks having addresses satisfying (L+a)mod M<b and other recording blocks are set to unrecorded area. The recording is performed in descending or ascending order of the addresses.

Consequently, similarly to the above (7), influence due to the fact that other layers (N−1 layers) except the target layer for recording have been recorded or reproduced can be made smaller than or equal to 1/N at most per layer in recording. That is, even if influence by all other layers is added, the sum total of influence can be suppressed to (N−1)/N or to be smaller than 1. Furthermore, since recordable blocks and unrecorded blocks of the test area are previously defined by addresses, how to use the test area can be made identical.

Moreover, the recording order thereof is also defined and accordingly even when recording and reproduction are performed by a plurality of drives, it is easily understood that individual blocks of the test area have been recorded or unrecorded and the drive interchangeability cam be improved.

FIGS. 13A and 13B show the effects of the present invention. FIG. 13A shows comparison of power adjustment result between the case where the recordable type optical disc of the present invention is used to perform recording power adjustment in the test area and the case of the recording method of the optical disc in the prior art. FIG. 13B shows the error ratio of recording data. The axis of abscissa represents the ratio of recorded area to user data area. The two kinds of optical discs are subjected to recording in a plurality of layers under the same conditions and in quasi-random order and loading and unloading at regular intervals, so that the recording power adjustment is forcedly performed to the optical discs. In the present invention, the result of the optimum power control is substantially fixed irrespective of the recorded ratio, whereas in the prior art the result of the optimum power control is widely scattered as the recorded ratio is increased and the recording power is also shifted to the high power side (FIG. 13A). That is, the prior art shows that the recording power is not the original recording power but is adjusted to the wrong recording power shifted to the high power side as recording is performed.

FIG. 13B shows evaluation of the quality of recording data in the case where recording is made by the recording method of the present invention and the case where recording is made by the prior-art recording method. The axis of ordinate represents the symbol error rate. The smaller the error rate is, the better the recording quality is. In the present invention, the error rate is always maintained to be smaller than or equal to about the minus fifth power of 10 irrespective of the recorded ratio and the satisfactory recording quality is maintained, although in the prior art the error rate is increased as the recorded ratio is increased. This shows that in the prior art the learning accuracy of the recording power is deteriorated and recording is performed with excessive recording power, so that the recording quality is reduced.

As described above, according to the present invention, since the learning of the recording power is not almost affected by difference between the case where the other layers are recorded and the case where the other layers are unrecorded, the learning accuracy of the recording power can be improved. Moreover, at this time, since the recording power learning areas for the respective layers can be arranged in substantially the same radial position in an overlapped manner, the user data capacity cannot be reduced. That is, in the multilayered optical disc having three or more recording layers, since sufficient test area can be ensured without reduction of the user data area and recording can be performed so as to control the laser irradiation power for the respective layers properly to be recorded, the reliability of the recording quality and the recording data is improved.

Other objects, features and advantages of the invention will become apparent from the following description of the embodiments of the invention taken in conjunction with the accompanying drawings.

DESCRIPTION OF THE EMBODIMENTS

Embodiment 1

Figure 6:
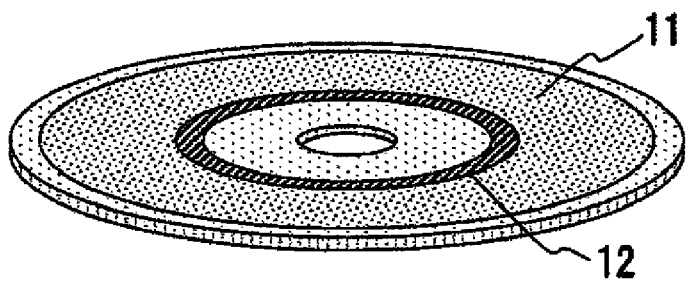
FIG. 6 shows arrangement of a test area and a user data area in an optical disc according to the present invention.

FIG. 6 shows arrangement of a user data area 11 and a test area 12 for learning and adjusting recording/reproduction conditions such as recording power in a multilayered optical disc according to present invention. In the Embodiment, the Test Area 12 is arranged on the internal circumference side as compared with the user data area 11.

Figure 1:
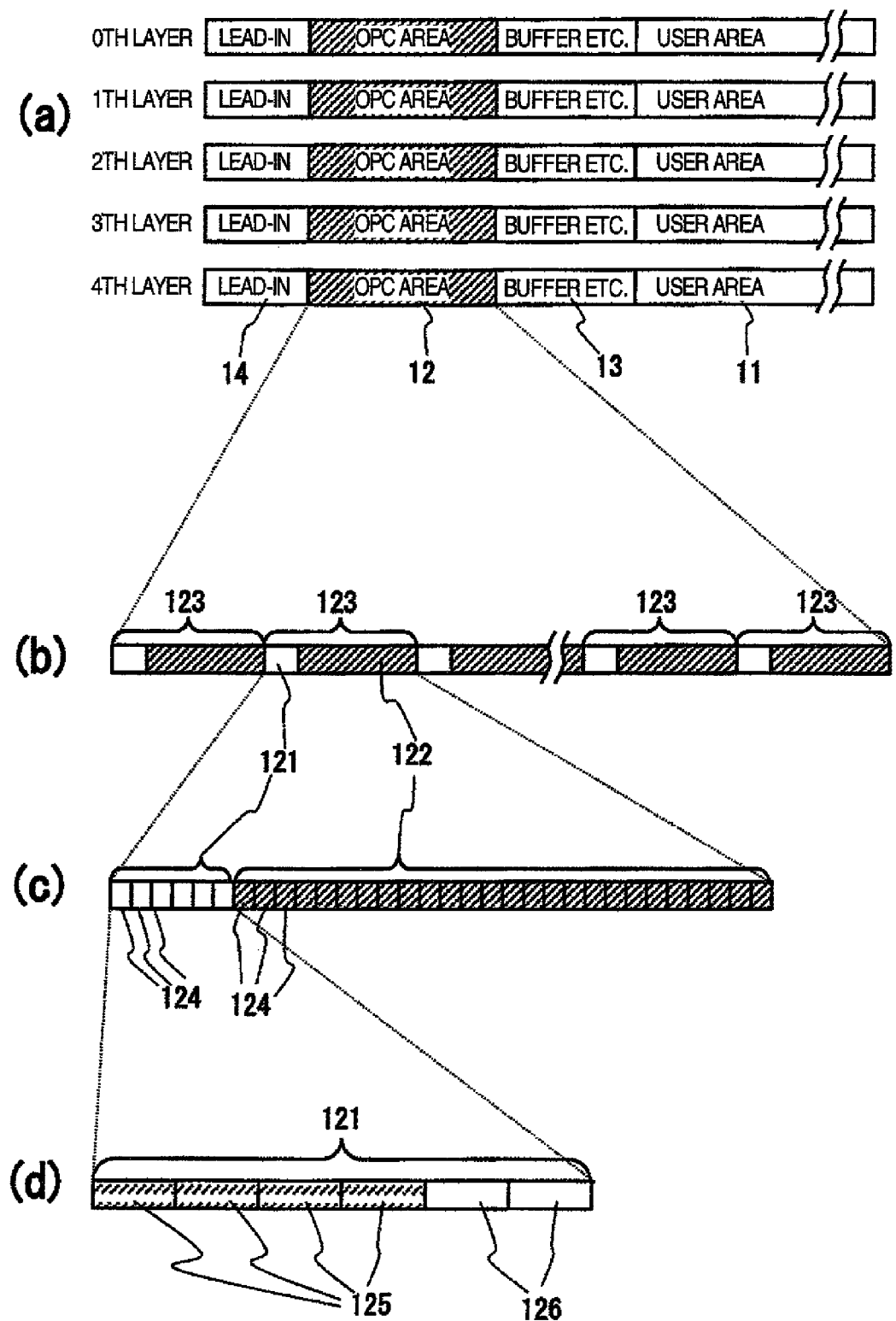
FIG. 1 shows arrangement of recording adjustment areas in a multilayered optical disc according to the present invention.
Figure 2:
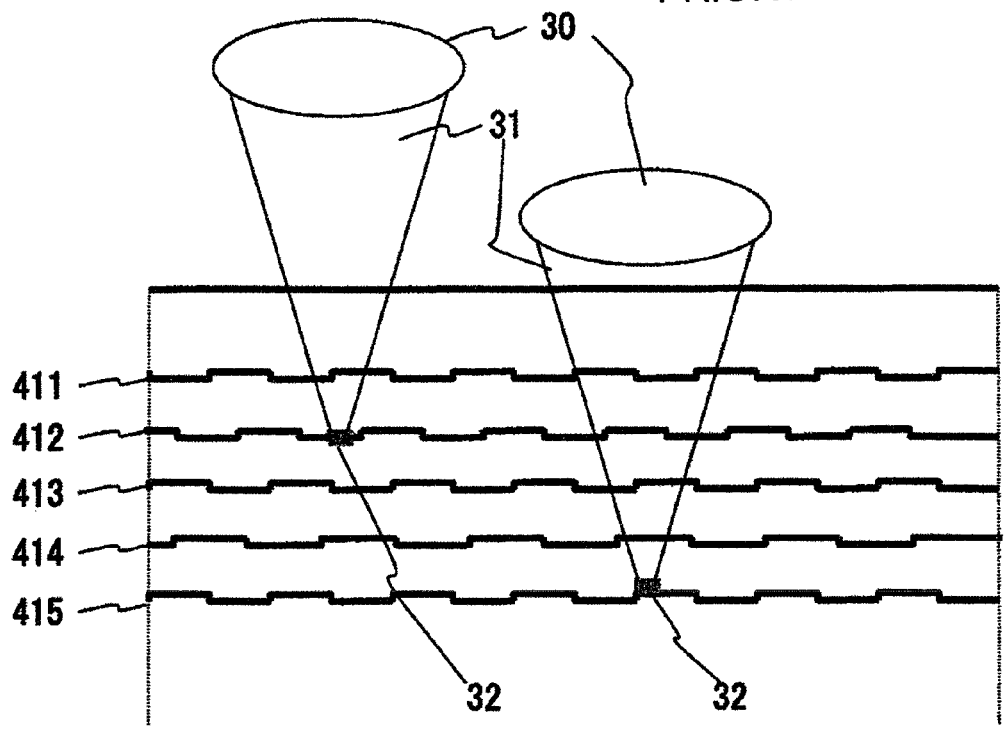
FIG. 2 schematically illustrates sectional structure of a multilayered optical disc and the principle of performing recording/reproducing of information in each recording layer independently.
Figure 3:
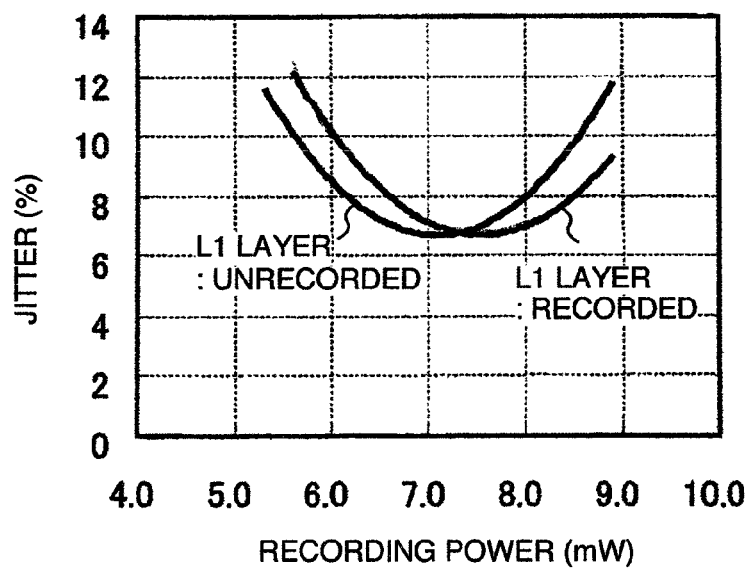
FIG. 3 is a graph explaining a problem in a prior-art multilayered optical disc.

FIG. 1 shows arrangement of areas in a multilayered optical disc (5-layered optical disc in the embodiment). FIG. 1(a) shows arrangement of user areas 11, test areas 12, lead-in areas 14 for positioning an optical head near the most internal circumference of the disc and areas 13 such as buffer areas between areas and control information recording areas in the plurality of recording layers. In FIG. 1, the left side is the internal circumference side of the disc and the right side is the outer circumference side of the disc. 0-th layer is positioned on the farther side from a light incident side and 4-th layer is nearest to the light incident side. That is, the 5-th recording layer 415 of FIG. 2 corresponds to 0-th layer of the embodiment and the 1st recording layer 411 of FIG. 2 corresponds to 4-th layer of the embodiment. Interlayer spacing between recording layers is set to be different for each layer so that influence of interlayer crosstalk is minimized, although the minimum value of the interlayer spacing is about 16 μm. The test areas 12 are named optimum power control (OPC) areas in a sense of learning areas for controlling power for recording to be optimum in the multilayered disc of the embodiment. The test areas 12 in the layers are positioned in substantially the same radial positions.

FIG. 1(b) shows the test area in detail, in which a plurality of segments 123 each containing a set of recordable test area 121 and write inhibited area 122 are arranged. Each segment 123 includes a plurality of recording unit blocks 124 as shown in FIG. 1(c). In the embodiment, the length of the recording unit blocks is equal to the length of about two thirds of one round (⅔ tracks) near the test area in the internal circumference part and the segment 123 includes 32 recording unit blocks 124 in total containing 6 recording unit blocks 124 belonging to the recordable test area 121 and 26 recording unit blocks 124 belonging to the write inhibited area 122. Accordingly, the number of recordable recording unit blocks 124 is 6/24=0.1875 of the number of recording unit blocks 124 belonging to the whole test area 121. In other words, in the embodiment, the number N of recording layers is 5 and accordingly the ratio 0.1875 of the recordable recording unit blocks is smaller than $1/N=1/5=0.2$.

In the embodiment, the address of the top recording block in the test area is 1900 h and since each segment includes 32 recording blocks, the address of the top recording block of each segment is 1900 h+20 h×n (where n is an integer larger than or equal to 0). Only 6 recording blocks from the top are recordable blocks and accordingly the address of the recordable block is represented by 1900 h+20 h×n+m (m=0, 1, 2, 3). When the address of the recordable block is expressed by L, this is expressed by another format as L mod 20 h<4. Since a=0, b=4 and M=32(=20 h), the expression is equivalent to (L+a)modM<b. Further, since N=5, b≦M/N and a+b<M are satisfied. That is, the condition of the measures (4) is satisfied.

Parameters such as a and b are not required to be identical in all layers and may be varied in each layer.

FIG. 1(d) shows that only parts (4 blocks in FIG. 1(d)) of the recordable unit blocks belonging to the small segment 123 are recorded blocks 125 and remaining parts (2 blocks in FIG. 1(d)) are unrecorded recordable blocks. In this example, the recordable blocks are used successively from the internal circumference side (from the left side of FIG. 1(d)).

When the test recording area is used as described above, the recorded area 432 of 6 blocks and the unrecorded area 431 of 24 blocks are arranged alternately. When it is converted into the number of tracks, one block corresponds to about two thirds tracks and accordingly the recorded area 432 of 6×⅔=4 tracks and the unrecorded area 431 of 24×⅔=16 tracks are arranged alternately. In the medium of the embodiment, the track pitch is 0.32 μm equal to that of the Bru-ray disc and accordingly the recorded area of about 1.3 μm and the unrecorded area of about 5.1 μm are arranged alternately.

It is considered that recording is made to another layer separated by the interlayer spacing d through the test area recorded above. When NA 0.85 of the objective lens and the refractive index n=1.6 of spacer layer between layers are used since the minimum value d of the interlayer spacing is 16 μm (d=16 μm), the beam diameter in the layer separated by the interlayer spacing d is $[d \times (NA/n)/\{1-(NA/n)^2\}^{(1/2)}] \approx 10$ μm. Accordingly, this beam spreads over 10×2/0.32≈60 tracks. Even if the recorded areas of about 1.3 μm and the unrecorded areas of 5.1 μm are mixed, influence thereof is integrated for the large optical beam having a diameter of 20 μm and only the ratio of 1.3 μm and 5.1 μm has an influence. In this example, when $[d \times (NA/n)/\{1-(NA/n)^2\}^{(1/2)}]/Tp \times (2\pi r)$ is calculated, 31×(2πr) is obtained. In other words, the length of the small recording areas (in this example, recording unit blocks) corresponds to 31 tracks, that is, it is understood that there is no problem unless the radius exceeds 10 μm. The embodiment satisfies the condition described in the measures (3).

Embodiment 2

Figure 4:
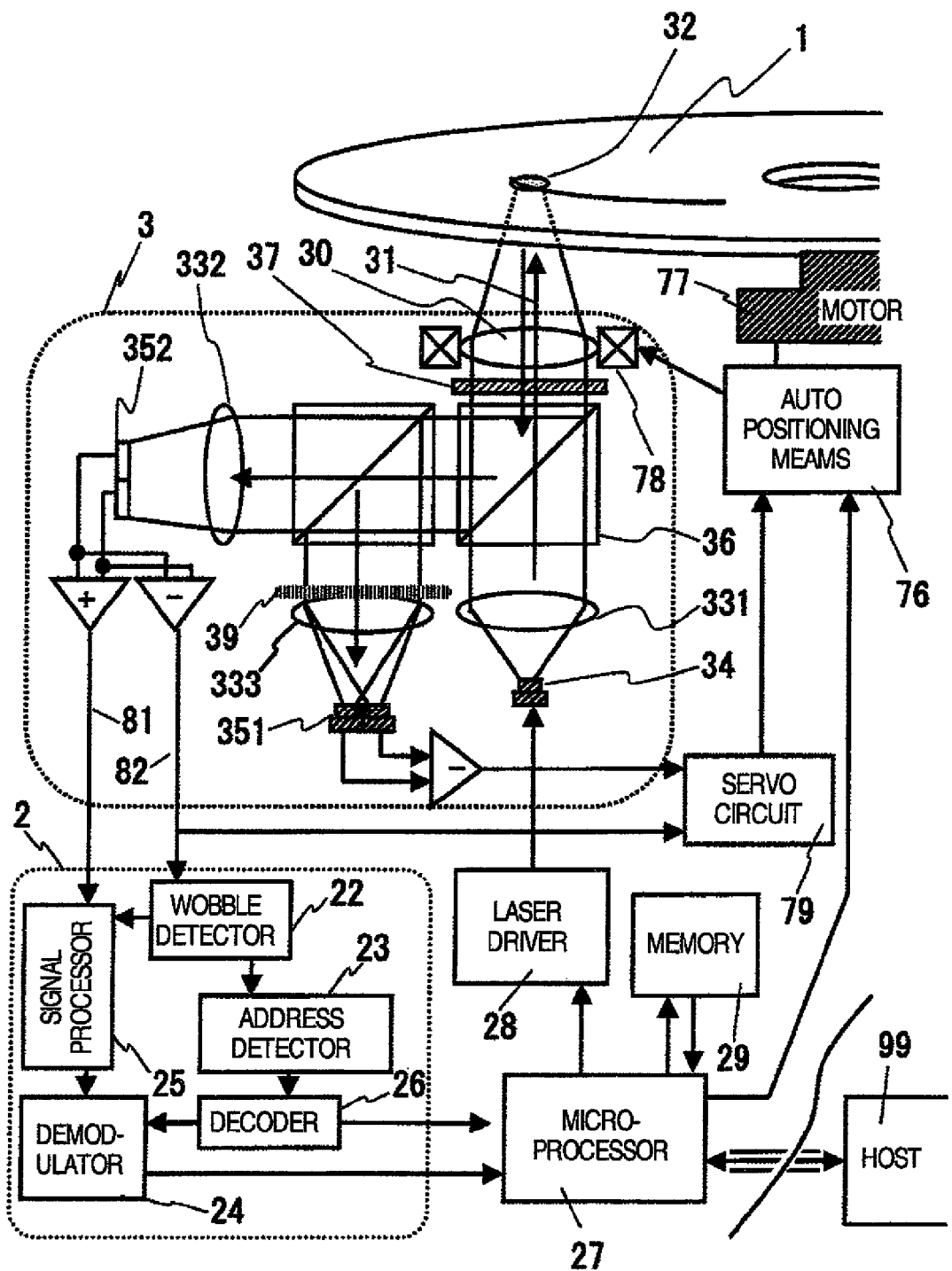
FIG. 4 is a diagram schematically illustrating an example of a recording/reproduction apparatus of a multilayered optical disc according to the present invention.
Figure 5A:
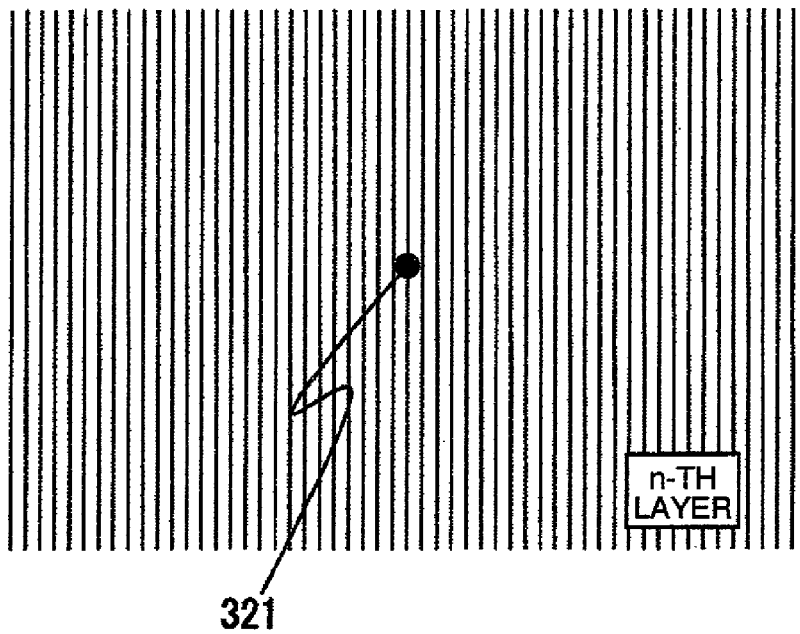
FIGS. 5A and 5B are diagrams explaining a problem of a prior-art multilayered optical disc.
Figure 5B:
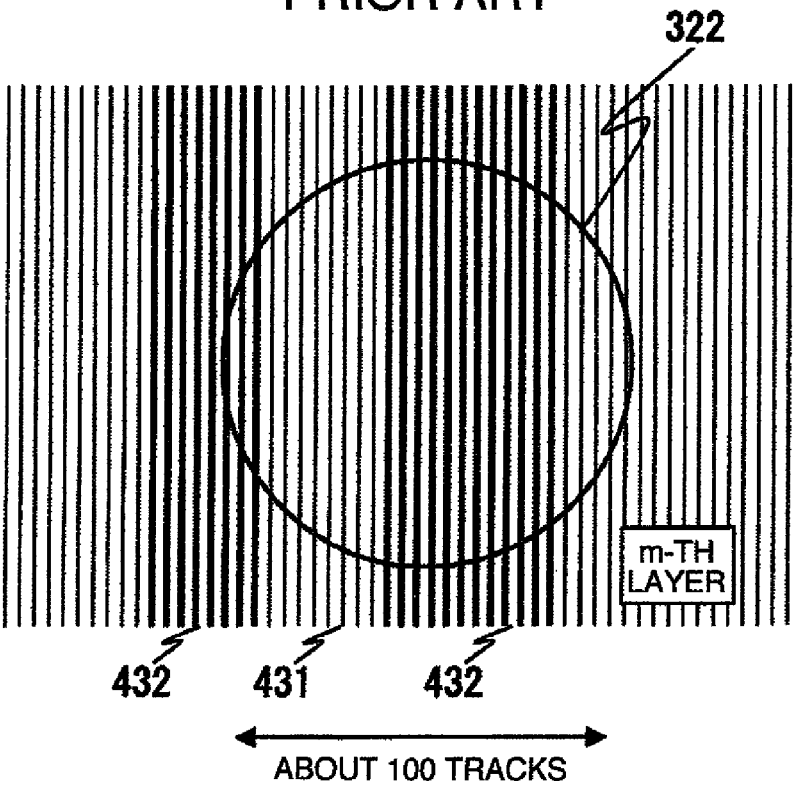

Next, an example of reproducing and evaluating various optical discs by a recording/reproduction apparatus shown in FIG. 4 is described. Light emitted from a laser light source 34 (having a wavelength of about 405 nm in the embodiment) constituting a part of an optical head 3 passes through a collimator lens 331 to be collimated into substantially parallel optical beam. The collimated optical beam passes through a beam splitter 36, an aberration compensation element 78 and an objective lens 30 and impinges on an optical disc 1 as a focused beam 31, so that an optical spot 32 is formed on the optical disc 1. Reflected light from the disc passes through the beam splitter 36, a holographic element 39 and the like and is led to a servo detector 351 and signal detector 352 by means of detection lenses 332 and 333. Signals from the detectors are subjected to addition and subtraction processing and supplied to a servo circuit 79 as servo signals such as tracking error signal and focusing error signal. The servo circuit controls the position of the whole of an objective lens actuator and the optical head 3 on the basis of the obtained tracking error signal and focusing error signal so that the optical spot 32 is positioned on a target recording/reproduction area. An addition signal of the detector 352 is supplied to a signal reproduction block 2. The input signal supplied to the signal reproduction block 2 is subjected to filtering and frequency equalization in a signal processor 25 and is then digitized. Address information formed in the form of wobble or the like of groove in the disc is detected as a differential signal from the division detector 352 and supplied to a wobble detector 22 in the signal reproduction block 2. The wobble detector 22 has the function of generating a clock synchronized with the wobble signal and discriminating a wobble wave. The wobble signal detected by the wobble detector 22 is converted into digital information by an address detector 23 and is then subjected to processing such as error correction by a decoder 26 to be detected as address information. A start timing signal for recording/reproduction processing is produced on the basis of the detected address information and a demodulator 24 for user data is controlled. At the same time, the address information is also supplied to a controller (microprocessor) 27 to be used for access.

In such an optical disc recording/reproduction apparatus, the method of performing recording/reproduction to the multilayered optical disc is basically the same as that described in the prior art. For example, when the recording medium having 5 recording layers described in the embodiment 1 is accessed, the position of the objective lens 30 is controlled to position the optical spot 32 on a target recording layer (e.g. 2nd layer). That is, the optical spot is focused on the target recording layer. At this time, the convergent light focused by the objective lens passes through another semitransparent recording layer (e.g. 4th or 3rd layer) on the nearer side on the way thereof but the beam diameter of the convergent light 31 on another recording layer is sufficiently larger than that of the optical spot 32 on the target recording layer. Accordingly, recorded information in the semitransparent recording layer cannot be analyzed or resolved and reproduced. That is, information on the target layer can be reproduced without influence of recorded information in another layer. In recording, since the beam diameter on the recording layer except the target layer is sufficiently larger, the light intensity per unit area is relatively small and it is not apprehended that information in the recording layer except the target layer is destroyed even in recording. In this manner, it can be realized that information can be recorded in or reproduced from the optical disc having the plurality of recoding layers.

As the method of learning the recording power using the above apparatus, generally, there are a method of detecting asymmetry of signal as described with reference to FIGS. 7 and 8 and a method of evaluating the power dependence of amplitude (modulation) of signal.

Figure 7A:
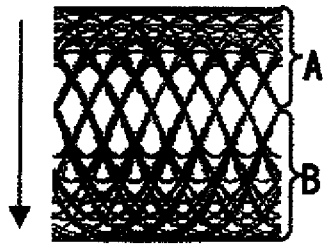
FIGS. 7A, 7B and 7C are diagrams explaining a method of detecting asymmetry which is an index for recording power adjustment.
Figure 7B:
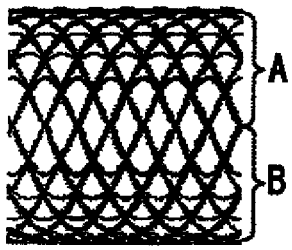
Figure 7C:
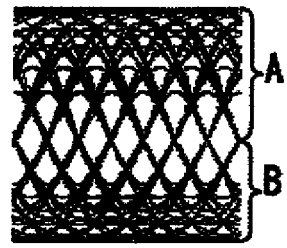
Figure 8A:
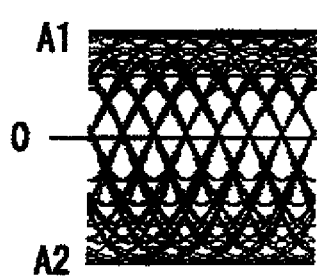
FIGS. 8A, 8B and 8C are diagrams explaining a method of detecting β which is an index for recording power adjustment.
Figure 8B:
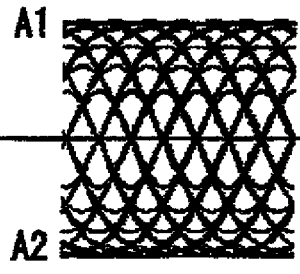
Figure 8C:
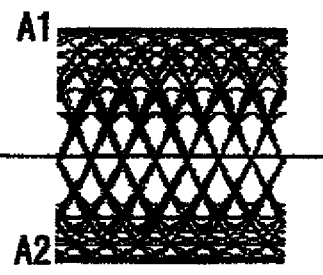

FIGS. 7A, 7B and 7C are diagrams explaining the method of measuring the amplitude from the center of eye-pattern of signal to the upper and lower envelopes of signal using the index named asymmetry generally. When the amplitude from the upper (space side) envelope to the center of eye-patter is A and the amplitude from the lower (mark side) envelope to the center of eye-patter is B, the asymmetry is defined by (A−B)/(A+B) and the asymmetry is changed from negative to position as the recording power is increased. The asymmetry in the recording condition of optimum power exists near zero although there is sometimes small (several %) offset depending on the characteristic of recording film of the optical disc. FIGS. 8A, 8B and 8C are diagrams explaining the method of removing DC component using a high-pass filter instead of calculation of the center of eye-pattern and measuring amplitudes A1 and A2 of the upper and lower envelopes on the basis of AC-coupled zero point, so that an evaluation index named β is calculated by β=(A1−A2)/(A1+A2). The two methods are slightly different but are common to the point that the optimum power exists near zero in both methods. It is often that any of the methods is selected to be used depending on circuit configuration of the apparatus. The method of evaluating the power dependence of the amplitude (modulation) of signal is not described here, although since DC amplitude is detected, the detection accuracy is apt to be deteriorated in the system which is easily affected by leakage light or stray light as the multilayered optical disc.

Embodiment 3

Figure 9:
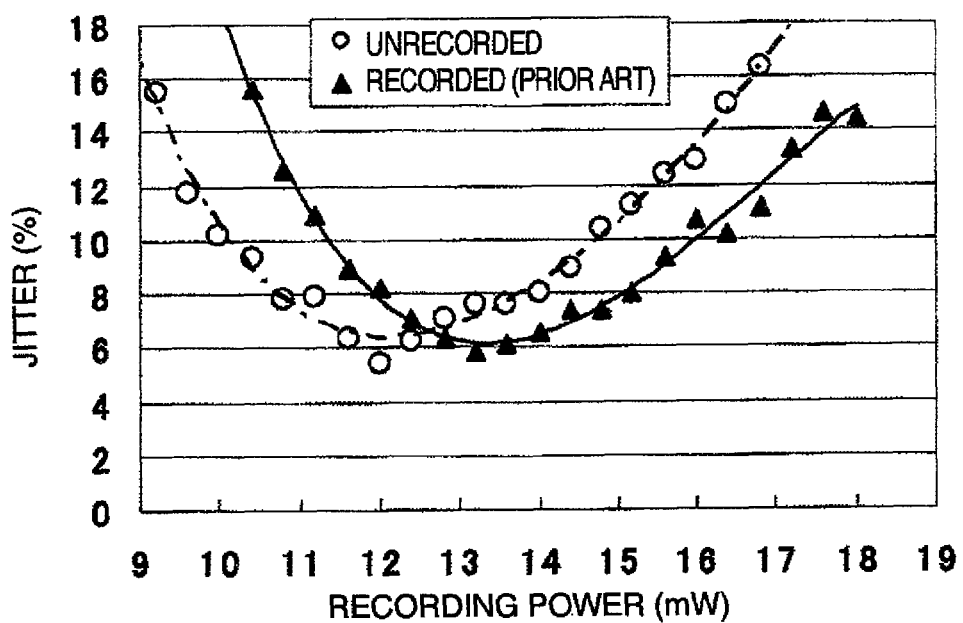
FIG. 9 is a graph showing the recording characteristic in a recording power adjustment area of a prior-art multilayered optical disc.

FIG. 9 shows an example of evaluating the quality of the reproduced signal of a 3-layered recordable type optical disc as jitter using the apparatus described in the embodiment 2. In this example, the recording characteristic (recording margin curve) of the target layer on the farther side is different between the case where two layers positioned on the nearer side are recorded and the case where the two layers are unrecorded. The cause is not the reproduction characteristic but is that when recording is made to the farther layer as viewed from the light incident side in the multilayered optical disc, the laser power reaching the farther layer is different due to difference of the effective transmittance of the nearer layer between the case where recording is made to the farther layer through unrecorded area in the nearer layer and the case where recording is made to the farther layer through recorded area in the nearer layer. The cause of variation in the recording characteristic is that the effective recording sensitivity is different and the effective recording power is varied.

Figure 10:
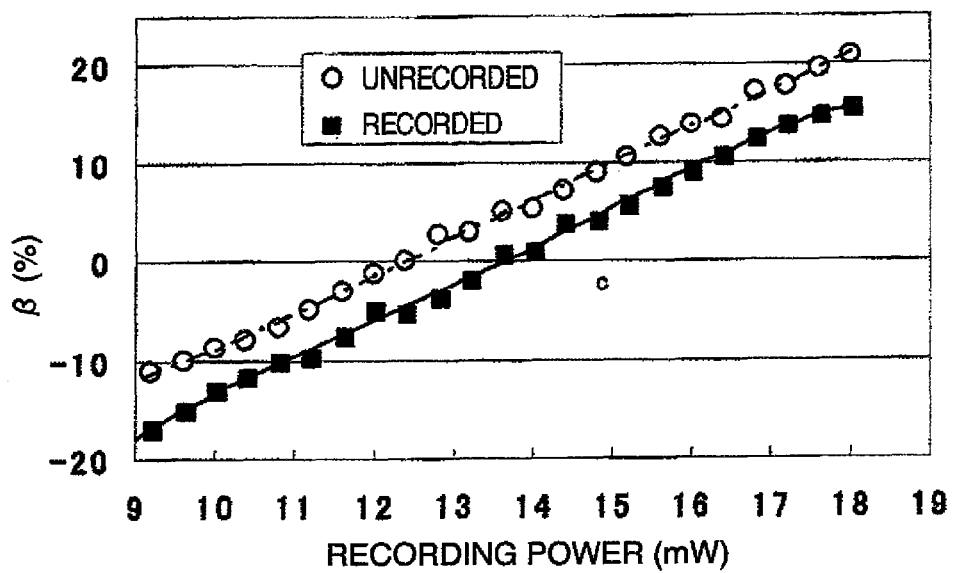
FIG. 10 is a graph showing the result of the recording power adjustment in the prior-art multilayered optical disc.

FIG. 10 shows an example of evaluating the β value of information recorded in the user data area of the farthest layer (0-th layer). When information is recorded in 2 nearer layers, the β value is reduced. That is, the optimum recording power is relatively shifted to the higher side and the effective recording sensitivity is reduced. This variation is 10% at the maximum in term of the recording power in the optical disc of the embodiment.

Figure 11:
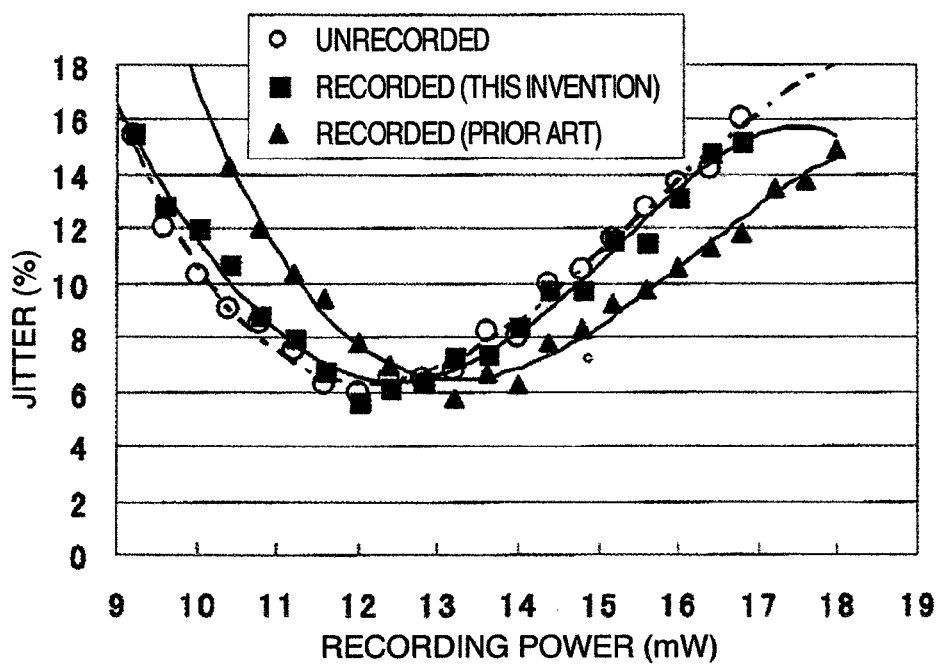
FIG. 11 is a graph showing the recording characteristic in the recording power adjustment area of the multilayered optical disc according to the present invention.

FIG. 11 is a graph showing evaluation of the recording characteristic (jitter) in the test area for recording adjustment in which the present invention is applied. It is understood that even after information is recorded in 2 nearer layers, the recording characteristic which is almost unchanged from the case where information is not recorded is attained and influence due to difference between recording and unrecording in the nearer layer is suppressed.

Figure 12:
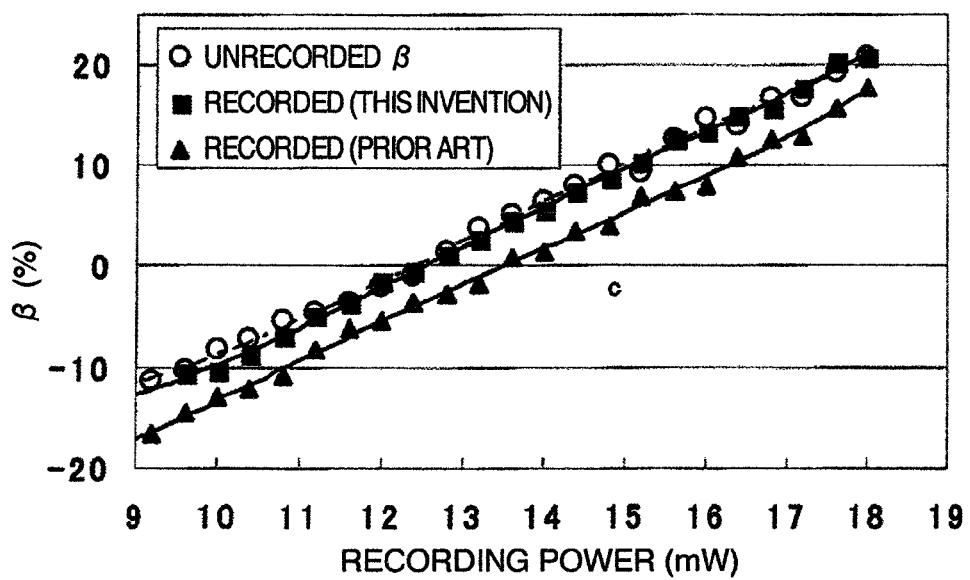
FIG. 12 is a graph showing the result of the recording power adjustment in the recording power adjustment area of the multilayered optical disc according to the present invention.

FIG. 12 is a graph showing evaluation of the β value in the test area for recording adjustment in which the present invention is applied. It is understood that even after information is recorded in 2 nearer layers, the recording sensitivity characteristic which is almost unchanged from the case where information is not recorded is attained and the recording power is obtained exactly. When information is recorded in the user data area actually, the recording power which is 5% larger than the exact recording power (12.1 mW) obtained in this manner is used. The reason is that since the recording sensitivity is reduced by 10% at the maximum depending on the recording state of the nearer layers in the user data area (the optimum power is increased), information is recorded with the recording power increased by 5%, so that information can be recorded in any of the area having the maximum recording sensitivity (2 nearer layers are unrecorded) and the area having the minimum recording sensitivity (2 nearer layers are recorded) with the power error smaller than or equal to 5%. In other words, information can be recorded using the recording power of about 12.7 mW near the bottom of the jitter curve for any of two jitter curves shown in FIG. 11, so that information can be recorded with substantially optimum recording power irrespective of the recording state in the nearer layer.

Figure 13A:
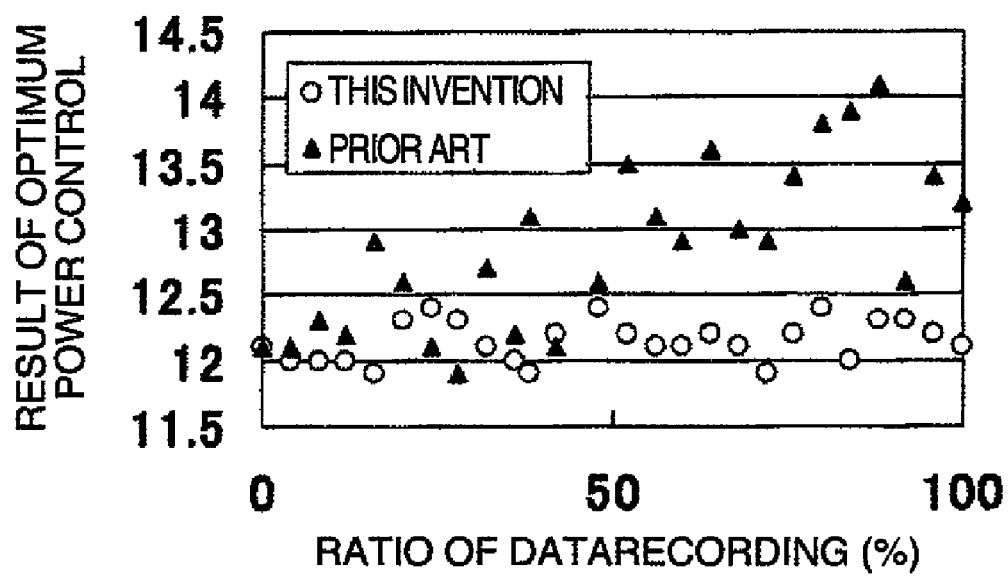
FIGS. 13A and 13B are graphs showing the effects of the present invention.
Figure 13B:
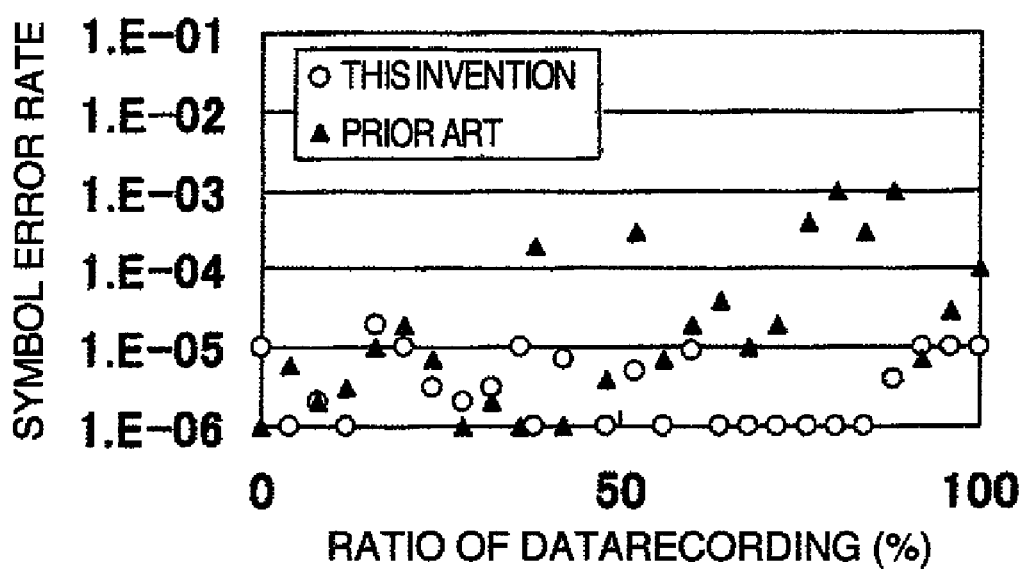

FIG. 13A shows comparison of the power adjustment result between the case where the recordable type optical disc of the present invention is used to perform the recording power adjustment in the test area and the case of the recording method of the optical disc in the prior art and FIG. 13B shows the error ratio of recording data. The axis of abscissa represents the ratio of recorded area to user data area. The two kinds of optical discs are subjected to recording in a plurality of layers under the same conditions and in quasi-random order and loading and unloading at regular intervals, so that the recording power adjustment is forcedly performed to the optical discs. In the present invention, the result of the optimum power control is substantially fixed irrespective of the recorded ratio, whereas in the prior art the result of the optimum power control is widely scattered as the recorded ratio is increased and the recording power is also shifted to the high power side (FIG. 13A). That is, the prior art shows that the recording power is not the original recording power but is adjusted to the wrong recording power shifted to the high power side as recording is performed.

FIG. 13B shows evaluation of the quality of recording data in the case where recording is made by the recording method of the present invention and the case where recording is made by the prior-art recording method. The axis of ordinate represents the symbol error rate. The smaller the error rate is, the better the recording quality is. In the present invention, the error rate is always maintained to be smaller than or equal to about the minus fifth power of 10 irrespective of the recorded ratio and the satisfactory recording quality is maintained, although in the prior art the error rate is increased as the recorded ratio is increased. This shows that in the prior art the learning accuracy of the recording power is deteriorated and recording is performed with excessive recording power, so that the recording quality is reduced.

As described above, according to the present invention, since the learning of the recording power is not almost affected by difference between the case where the other layers are recorded and the case where the other layers are unrecorded, the learning accuracy of the recording power can be improved. Moreover, at this time, since the recording power learning areas for the respective layers can be arranged in substantially the same radial positions in an overlapped manner, the user data capacity is not reduced. That is, in the multilayered optical disc having three or more recording layers, since sufficient test area can be ensured without reduction of the user data area and recording can be performed so as to control the laser irradiation power for the respective layers properly to be recorded, the reliability of the recording quality and the recording data is improved.

Embodiment 4

Figure 14:
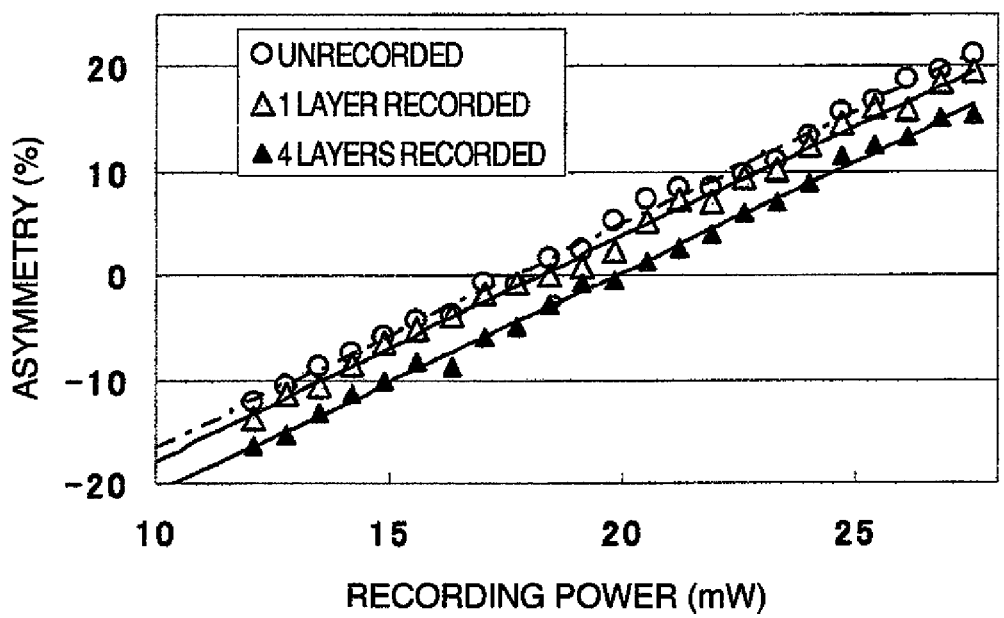
FIG. 14 is a graph showing the recording characteristic in the recording power adjustment area of a prior-art 5-layered optical disc.

FIG. 14 shows an example of evaluating the asymmetry of the information recorded in the user data area in the farthest layer (0-th layer) of the recordable type 5-layered optical disc described in the embodiment 1 using the apparatus described in the embodiment 2. When information is recorded even in one nearer layer, the asymmetry is reduced. That is, the optimum recording power is relatively shifted to the higher side and the effective recording sensitivity is reduced. This variation is maximum when information is recorded in all of 4 nearer layers and the recording power is varied 12% at the maximum.

Figure 15:
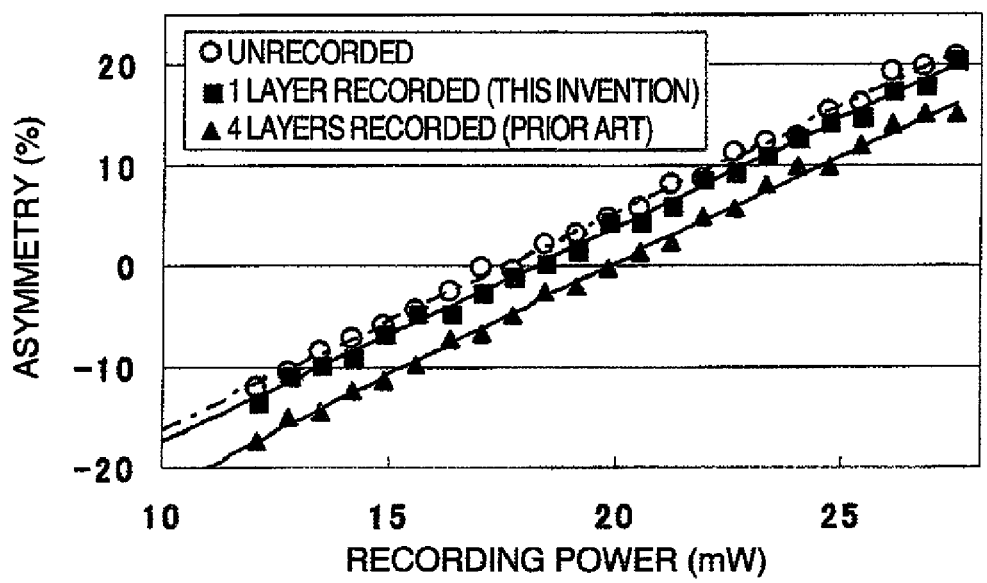
FIG. 15 is a graph showing the result of the recording power adjustment in the recording power adjustment area of a 5-layered optical disc according to the present invention.

FIG. 15 shows the asymmetry evaluated in the test area for recording adjustment in which the present invention is applied. It is understood that even after information is recorded in four nearer layers, the recording sensitivity characteristic which is almost unchanged from the case where information is not recorded is attained and the recording power can be obtained exactly.

When the obtained recording power is used to record information in the user area actually, the recording is performed using the recording power which is about 6% larger than the optimum power. This is made in consideration of the fact that the necessary recording power is increased by 12% when all of the nearer layers are recorded as compared with the case where all of the nearer layers are unrecorded. The recording power obtained by learning in the test area is always equal to the recording power in the case where the nearer layers are unrecorded when the present invention is applied. However, since the recording sensitivity is reduced by 12% at the maximum depending on the recording state in the nearer layer of the user data area (the optimum power is increased), information is recorded with the recording power increased by 6%, so that information can be recorded in any of the area having the maximum recording sensitivity and the area having the minimum recording sensitivity with power error smaller than or equal to 6% at most. In the multilayered optical disc of the present invention, since the margin of the recording power is about ±13%, the error of 6% may be allowed, although when the recording method of the present invention is not applied, the power error of 12% is caused and accordingly the margin is almost lost or reduced to zero, so that this is the cause for occurrence of error by other stress such as the disc tilt. As a method as to what times of the recording power obtained in the test area the recording power for the user area is increased, there are a method of evaluating the characteristic for each disc and for each layer of each disc previously and storing it in a drive as a comparative table and a method of describing it in a control information area of the disc, although it is desirable that it is previously described in the control information area of the disc from the viewpoint of the interchangeability.

The effects of the present invention are not limited to those of the above described embodiments. For example, as the recording layers of the optical disc, the rewritable type recording layers may be used in addition to the recordable type recording layers. In case of the rewritable type recording layers, since the exact recording power cannot be necessarily obtained if the asymmetry and the β are used, it is desirable that indexes such as modulation, $\epsilon$, $\gamma$ and $\kappa$ are used as the index of the OPC for recording power adjustment.

Furthermore, the ratio of the recordable areas of the test area is not required to be the same in all layers and the condition of 1/N is not necessarily required to be satisfied in all layers. For example, it is considered that the ratio of the recordable areas is made small in the layer having the transmittance varied widely in the recorded state and the unrecorded state and the ratio is made small in the layer where variation is small. Alternatively, it is effective for the efficient utilization of the test areas that the ratio of the recordable areas is made smaller or equal to 1/N in only the layer having the transmittance varied widely in the recording state and the unrecorded state.

Moreover, it is effective that the method of the present invention of restricting the ratio of the recordable areas is applied to not only the test area but also a management area in which recording management information, defect management information and the like are recorded. In this case, recording in the management information area can be performed with high quality and high reliability as compared with the ordinary user information area and accordingly the recording reliability of the whole disc can be improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multilayered optical disc having N (N is an integer at least equal to 3) information recording layers of rewritable or recordable type;
    wherein each of the information recording layers at least includes a test area to adjust conditions for recording and reproduction;
    wherein the test area in each layer includes a plurality of small segments;
    wherein the small segments include first small segments for test recording and second small segments where information is not test recorded;
    wherein when a minimum value of an interlayer distance of the information recording layers is d, a refractive index of a space layer between the recording layer is n, an opening ratio of an objective lens of an optical pickup used in recording/reproduction is NA, a track pitch is Tp, a radial position of the small segment is r, and a length of each small segment in a circumferential direction of the optical disc does not exceed $[d \times (NA/n)/\{1-(NA/n)^2\}^{(1/2)}]/Tp \times (2\pi r)$.

2. A multilayered optical disc according to claim 1, wherein
    each of the small segments includes K recording unit blocks (K is an integer at least equal to 1).

3. A multilayered optical disc according to claim 1, wherein
    at least parts of the radial position of the test area in the optical disc overlap one another between different layers.

4. A multilayered optical disc according to claim 1, wherein the first small segments for test recording are in a number no greater than 1/N of the whole number of the plurality of small segments, and a remaining number of the small segments are the second small segments where information is not test recorded.

5. A recording method for recording information on a multilayered optical disc having N (N is an integer at least equal to 3) information recording layers of rewritable or recordable type;
 wherein each of the information recording layers at least includes a test area to adjust conditions for recording and reproduction;
 wherein the test area in each layer including a plurality of small segments;
 wherein the small segments include first small segments for test recording and second small segments where information is not test recorded;
 wherein when a minimum value of an interlayer distance of the information recording layers is d, a refractive index of a space layer between the recording layers is n, an opening ratio of an objective lens of an optical pickup used in recording/reproduction is NA, a track pitch is Tp, a radial position of the small segment is r, and a length of each small segment in a circumferential direction of the optical disc does not exceed $[d \times (NA/n)/\{1-(NA/n)^2\}^{(1/2)}]/Tp \times (2\pi r)$; and
 performing test recording in the test area of the first small segments.

6. A recording method according to claim 5, wherein each of the small segments including K recording unit blocks (K is an integer at least equal to 1).

7. A recording method according to claim 5, wherein at least parts of radial position of the test area in the optical disc overlap one another between different layers.

8. A recording method according to claim 5, wherein the first small segments for test recording are in a number no greater than 1/N of the whole number of the plurality of small segments, and a remaining number of the small segments are the second small segments where information is not test recorded.

* * * * *